United States Patent [19]

Fritz, deceased

[11] Patent Number: 4,866,233
[45] Date of Patent: Sep. 12, 1989

[54] SYSTEM FOR HEATING OBJECTS WITH MICROWAVES

[75] Inventor: Karl Fritz, deceased, late of Freiburg, Fed. Rep. of Germany, by Michael Schmidt-Hofmer, Administrator

[73] Assignee: Snowdrift Corporation N.V., Curacao, Netherlands Antilles

[21] Appl. No.: 238,252

[22] Filed: Aug. 30, 1988

Related U.S. Application Data

[60] Division of Ser. No. 888,959, Jul. 24, 1986, Pat. No. 4,775,770, which is a continuation of Ser. No. 638,747, Aug. 8, 1984, abandoned.

[30] Foreign Application Priority Data

| Aug. 10, 1983 | [DE] | Fed. Rep. of Germany | 3333695 |
| Nov. 17, 1983 | [DE] | Fed. Rep. of Germany | 3341585 |
| Dec. 14, 1983 | [DE] | Fed. Rep. of Germany | 3345150 |
| Mar. 24, 1984 | [DE] | Fed. Rep. of Germany | 3411017 |
| May 21, 1984 | [DE] | Fed. Rep. of Germany | 3418843 |
| Jun. 12, 1984 | [DE] | Fed. Rep. of Germany | 3421778 |

[51] Int. Cl.$^4$ ............................................. H05B 6/70
[52] U.S. Cl. ......................... 219/10.55 A; 219/10.55 F
[58] Field of Search ............... 219/10.55 A, 10.55 R, 219/10.55 M, 10.55 F, 10.55 E, 10.55 D, 10.55 B; 34/1

[56] References Cited

U.S. PATENT DOCUMENTS

| 2,593,067 | 4/1952 | Spencer | 219/10.55 FX |
| 2,603,741 | 7/1952 | Seifried et al. | 219/10.55 A |
| 3,276,138 | 10/1966 | Fritz | 219/10.55 R |
| 3,402,277 | 9/1968 | Muller | 219/10.55 A |
| 3,529,115 | 9/1970 | Jawor | 219/10.55 A |
| 3,532,847 | 10/1970 | Puschner | 219/10.55 E |
| 3,570,391 | 3/1971 | Rejler | 219/10.55 A |
| 3,710,063 | 1/1973 | Aine | 219/10.55 A |
| 3,718,082 | 2/1973 | Lipoma | 219/10.55 A |
| 3,761,665 | 9/1973 | Nagao et al. | 219/10.55 A |
| 3,916,137 | 10/1975 | Jurgensen | 219/10.55 A |
| 3,974,353 | 8/1976 | Goltsos | 219/10.55 A |
| 3,999,026 | 12/1976 | Boling | 219/10.55 A |
| 4,004,122 | 1/1977 | Hallier | 219/10.55 A |
| 4,039,796 | 8/1971 | Leiben et al. | 219/10.55 A |
| 4,128,751 | 12/1978 | Sale | 219/10.55 A |
| 4,187,405 | 2/1980 | Püschner et al. | 219/10.55 A |
| 4,207,452 | 6/1980 | Arai | 219/10.55 A |
| 4,208,806 | 6/1980 | Manser et al. | 34/1 |
| 4,246,462 | 1/1981 | Meisel | 219/10.55 F |
| 4,323,745 | 4/1982 | Berggren | 219/10.55 A |
| 4,339,295 | 7/1982 | Boretos et al. | 219/10.53 X |
| 4,370,555 | 1/1983 | Noda | 219/10.55 B |
| 4,393,671 | 7/1983 | Ito | 219/10.55 A |

Primary Examiner—Philip H. Leung
Attorney, Agent, or Firm—Sandler & Greenblum

[57] ABSTRACT

A system is provided for heating sealed packages with microwaves, in particular under enhanced pressure. At least two microwave frequency radiators are employed for obtaining a controlled heat distribution inside of an object to be heated and the two radiations are at least over a time average superposed. The object is disposed near the maximum high frequency field strength corresponding to the high frequency distribution of the sum field. The microwave heating system is provided as a continuous furnace, which comprises a tube for guiding the objects to be heated as well as one or more microwave emitters disposed next to each other in the transport direction. The tube is provided with two coaxial tubes inserted into each other, where one is a metal tube with entrance openings for the microwaves and the other is a plastic tube for pressure sealing of the entrance openings. Receiver containers are provided for the objects to be heated and transported. Guide and sealing rings are provided at the ends of the receiver containers. A pressure tight working area is provided in the intermediate region of the receiver container. This allows to heat up the continuously passing packaged objects and the internal pressure is compensated by the outer pressure prevailing in the working area or, respectively, working area section. The heating is preferably for providing sterilization at temperatures above 80 degrees centigrade.

10 Claims, 5 Drawing Sheets

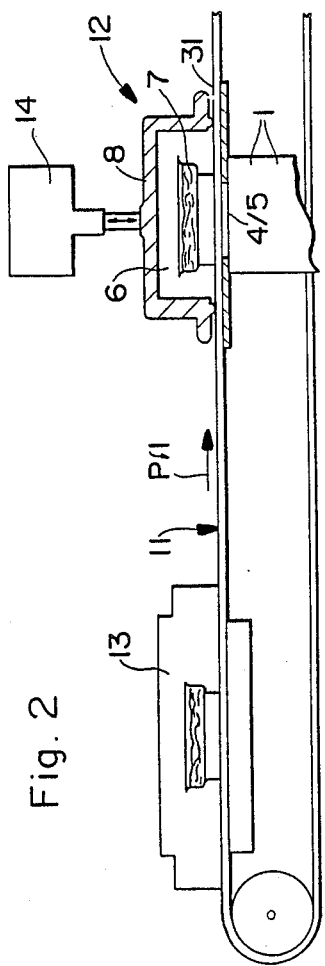
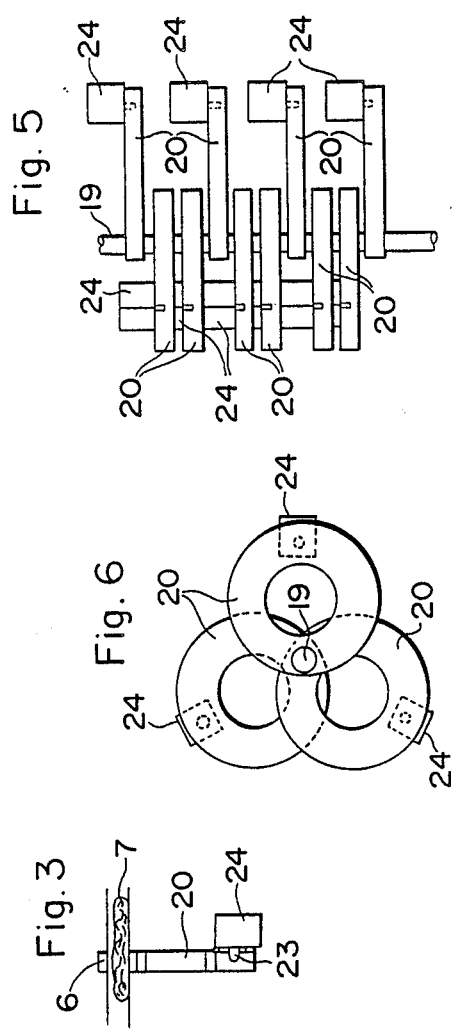

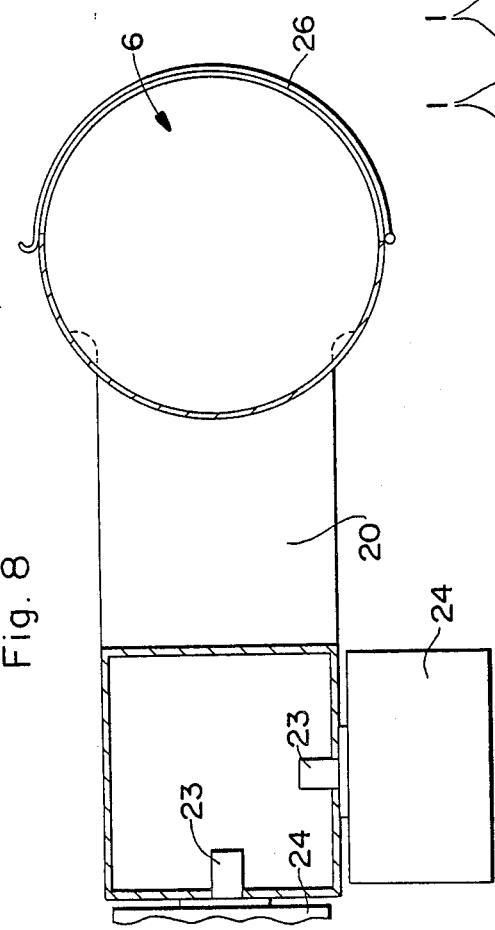
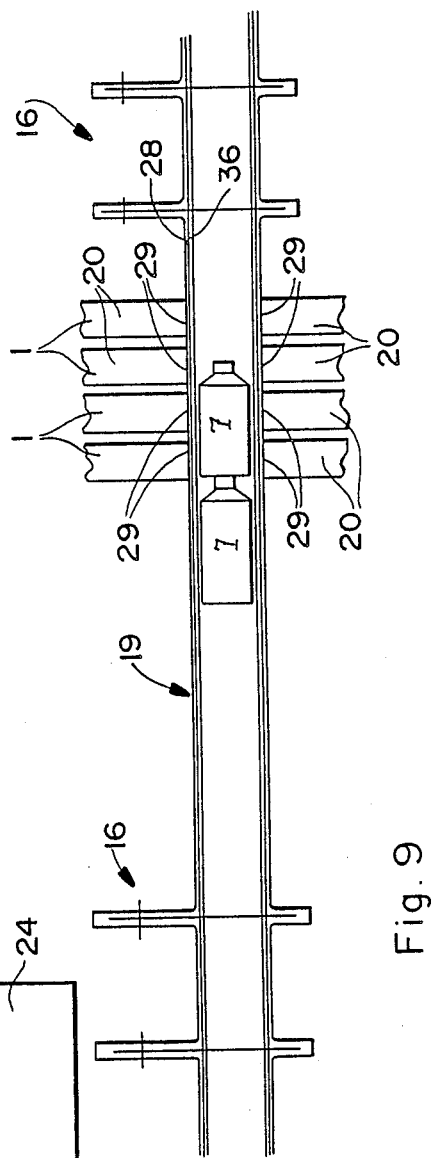

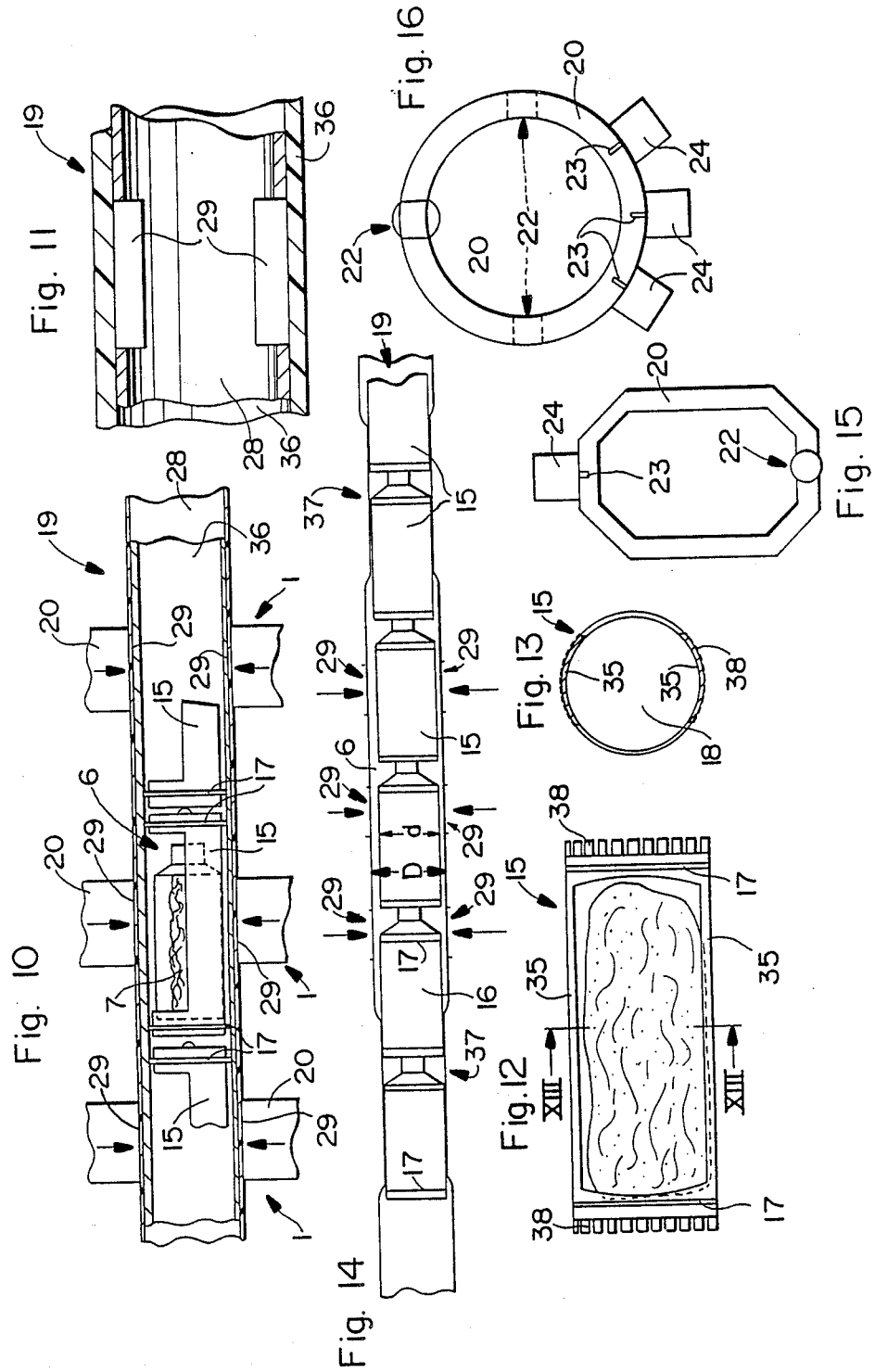

SYSTEM FOR HEATING OBJECTS WITH MICROWAVES

This is division of application Ser. No. 888,959, filed July 24, 1986, now U.S. Pat. No. 4,775,770, which is in turn a continuation of application Ser. No. 638,747, filed 8/8/84, now abandoned.

BACKGROUND OF THE INVENTION

1. Field of the Invention

The present invention relates to a method and apparatus for heating of air-tight packaged objects with microwaves and preferably under external excess pressure. 2.

2. Brief Description of the Background of the Invention Including Prior Art

Methods and apparatus for using microwaves for heating purposes are known in various forms and shapes, where the microwaves are employed for heating purposes. For example, microwave provisions are employed for the thawing of deep-frozen foods. It is disadvantageous in this context that the objects can be provided only with a comparatively thin thickness, since these microwave provisions have only a small penetration depth, such that in case of a larger object cross-section no homogeneous warming is possible. This means in practical terms that objects with larger cross-section begin to thaw, but are not thawed completely or, respectively, cannot be heated within a short time up to their eating temperature because of the danger of causing damage such as the running away of the outer regions in the case cakes containing whipped cream or the charring of the outer layer in case of chicken.

In particular during heating above 80 degrees centigrade there arise problems for air-tight sealed objects, since the packaging is subjected to an increasing pressure with increasing temperature, which finally can result in a ripping open of the package. However, heating to above 80 degrees centigrade is required for sterilization purposes. Therefore, already microwave provisions have been constructed where the heating is performed under external pressure.

Thus packaged objects are sent through a transport tube, where the necessary overpressure is provided by the pressurized water according to U.S. Pat. No. 3,809,844. Here it is disadvantageous that the objects have to be very small for a homogeneous heating. Nevertheless, there are still problems with the homogenization in the edge and corner regions. One has attempted to balance these deficiencies based on additional steps and in particular by heating of the surrounding water. Thus it is required to achieve a temperature balancing via conventional heat conduction based on liquid or gaseous intermediate means in addition to the heating with microwaves.

SUMMARY OF THE INVENTION

1. Purposes of the Invention

It is an object of the present invention to provide a method for sterilization of objects having a consistency differing in size, shape, configuration and material as well as quantity per unit of time by employing microwaves under pressure.

It is another purpose to provide a rapid and directed heating with the aid of the microwaves, where the requirement for an outside pressure as a counter pressure against the inside pressure caused by the heating can be met.

It is a further purpose to provide a system which is well adapted to the mass treatment of air-tight sealed food packages, where the microwave energy is focussed onto the package and where the configuration allows for a prompt quenching of the package after the treatment.

These and other objects and advantages of the present invention will become evident from the description which follows.

2. Brief Description of the Invention

The present invention provides a method for heating of air-tight sealed objects with microwaves which comprises disposing at least two microwave heating emitters to be superposed to a sum field at least when time averaged, placing an object at the geometric location where the sum field occurs, and irradiating the object with microwaves sufficiently strong such that the object is subjected to controlled heating while located near the field strength maximum of the joint microwave field.

The energy of an emitter can be subdivided in two directions for forming two separate sources for entering the operating area, where the field components produced by the two sources in the working area are of the same polarization. Alternatively, the energy of an emitter can be subdivided in two directions for forming two separate sources for entering the operating area, where the field components produced by the two sources in the working area are of different polarization. Preferably, two emitters are employed which operate in step at about the same frequency and amplitude while the polarizations of the component fields are vertical relative to each other. At least two emitters can be employed of about the same frequency and amplitude and where the resulting two radiation fields are radiated from opposite sides of a work space at a low frequency alternating cycle. The radiation of at least two microwave emitters can be controlled with pulse control circuits.

The high frequency irradiation can be controlled via a sensing of a thermodynamic variable near the operating microwave field. Preferably, the high frequency radiation is controlled via a temperature measurement or by a pressure measurement.

An object can pass intermittently at the microwave irradiation area. The pulse cycle can also be controlled with a temperature measurement or with a pressure measurement. Alternatively, objects can pass continuously at the microwave irradiation area. The radiation source can be shut off during the transition from one object to be heated to the next. The objects can be cooled directly after the heating by providing a cooling medium with at least the pressure, which surrounds the object. A top metal part of the casing can be removed, which part is constructed to provide a seal against a work support plate having the inlets for the high frequency radiation.

There is also provided an apparatus for heating of air-tight sealed objects with microwaves which comprises a microwave emitter, and a pressure-tight working area enclosed with metal with at least two radiation inlet openings each connected to a microwave emitter and disposed that the two resulting microwave fields superpose such in an object at least over a time average under consideration of the absorption of the object that a presettable temperature distribution occurs in the object.

Means for pressurizing the enclosed working area can be furnished, which is connected to the working area. A magnetron can serve as a microwave emitter. The openings for the entering microwave radiation can be disposed in the area of the ends of the longitudinal direction of the work area and where the work area is dimensioned such that a longitudinal resonance of the work area occurs. An entrance port can be provided for moving cooling medium to the working area. An exit port can remove the cooling medium from the working area. Windows can be located in the bottom part of the work area near the longitudinal ends covering the radiation entrance openings, which are air-tight based on a radiation-permeable cover. A dome like metal case part can sealingly be placed onto the bottom part for defining the work area. At least one cylindrical hollow wave guide can be provided with symmetrical locations for coupling in and coupling out and where the pressure tight work area is formed based on a part of this hollow waveguide at the decoupling station.

The direction of the microwave field can be disposed in parallel to the extension or, respectively, transport direction of the object. The microwave emitter with its radiators can be disposed in parallel to the longitudinal extension of the object. The cross-section of the hollow waveguide can be rectangular with larger sides in radial direction. The side entrance and exit openings of the work area can be terminated by metallic hollow cylinders of below critical diameter. The hollow waveguide can be formed by the difference space of two concentric balls with different radii. The coupling in and coupling out locations can be placed at two oppositely disposed poles.

The hollow waveguide can be of a square shape and the waveguide emitter can be provided by two magnetrons with polarization directions independent of each other and directed vertical to each other. Several annular hollow waveguides can be disposed side by side next to each other. In particular hollow waveguides with magnetrons disposed on their side can be rotary staggered relative to each other in order to obtain space for the emitters coupled to them. An about annular hollow waveguide can have a rectangular cross-section with sides shorter in radial direction as compared to the axial direction and a magnetron can be disposed at the circumference of the hollow waveguide.

Adjustable stubs can be coupled into the work area for influencing the field distribution in the work area. Preferably, the working area is formed substantially by a metallic tube with radiation permeable, but pressure sealed, closed window openings for the microwave radiation. A plastic tube can contact the metal tube on the inside and on the outside for sealing the window openings. A transporting provision can be furnished for transporting the objects through the working area. Preferably, pressure locks are disposed at the start and end of the working area. At least one cooling chamber can be disposed about the exit pressure lock. Flask like containers can be employed for receiving and for transporting of objects through the tubular working area, which can be coupled to each other and which are provided with guide rings. Openings at the opposite longitudinal sides of the container can be used for loading and unloading as well as for irradiation with microwave energy. The flask like containers are preferably closed on their front side with metal walls. Longitudinal webs can be disposed opposite to each other and connecting the metal walls. The guide rings can be disposed at the ends of the containers and can be provided simultaneously as sealing rings resting against the inner wall of the guide tube.

The transporting provision for the containers can extend outside of the working area and of any cooling provision for loading and unloading purposes such that a circle is formed. Parts of the guide tube disposed outside of the working area can be provided with openings in some areas for loading and unloading purposes. The container can be joined to a chain, which is connected via flexible couplings. The transport provision can be furnished with substantially symmetrical toothed gear rings, which engage the outer jacket of the container while bridging the guide rings. The guide tube can be constructed with a slightly larger inside diameter in the working area as compared with the outside diameter (d) of the container. A guide tube section can join on the two sides of the working area with a smaller inside diameter as compared with the guide tube of the working area and is constructed for the purpose of providing a seal.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 2 is a side view of a working area with a transport provision provided as a transport belt for feeding objects to the working area, FIG. 3 is a side view of an annular hollow waveguide with symmetrically disposed coupling in and coupling out connections, FIG. 4 is a cross-sectional view of the provision of FIG. 3, FIG. 5 is a view of several hollow waveguides arrangements with a tubular passage path for an object to be heated, FIG. 6 is a front side view of several hollow waveguide arrangements about as shown in FIG. 5, FIG. 8 is a cross-sectional representation corresponding to the section line VIII—VIII of FIG. 7, FIG. 9 is a plan view of a device for a continuous passage of the objects to be heated, FIG. 10 is a more detailed view as compared to the view of FIG. 9 in the area of the irradiation zone, FIG. 11 is a longitudinal sectional view of a guide tube in the region of an irradiation window, FIG. 12 is a sectional view of a receiver container for objects to be heated, FIG. 13 is a sectional view of the receiver container shown in FIG. 12 along section line XIII—XIII in FIG. 12, FIG. 14 is a sectional view of an embodiment, which is modified as compared with the embodiment of FIGS. 9 and 10, FIG. 15 is a schematic sectional view of an arrangement of hollow waveguides similar to that of FIG. 3, however here the microwave emitters are disposed at the outer circumference.

FIG. 16 is a schematic sectional view through a magnetron chamber.

DESCRIPTION OF INVENTION AND PREFERRED EMBODIMENT

Figure 1:
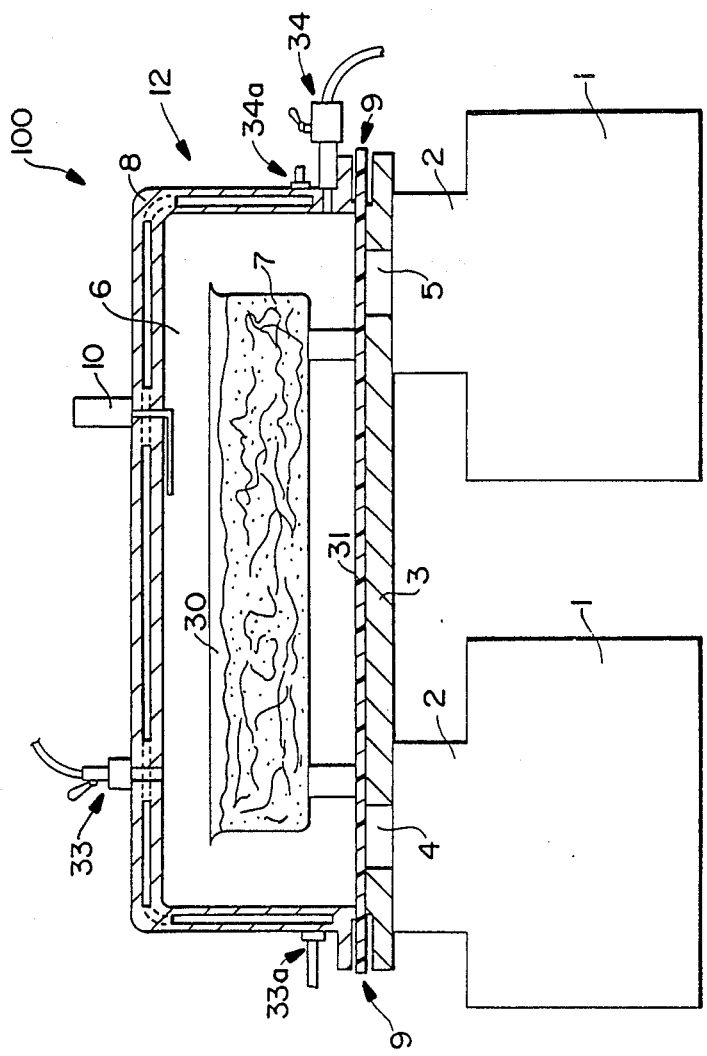
FIG. 1 is a sectional view of a working area with an object inside, which object is to be heated, and indicating two microwave emitters connected to the working area.

In accordance with the present invention there is provided a system for the heating of air-tight packaged objects with microwaves and preferably under the influence of outside overpressure. At least two high frequency irradiation sources are provided for a desired thermal heating distribution inside of the objects and the fields generated by the two high frequency irradiation sources overlap at least when averaged over time. The object is placed in the region of a maximum corresponding to the distribution of the sum field of the high frequency fields. The irradiation from at least two directions results in the possibility of furnishing a very high energy concentration in parts or over all of the object to be heated, which can further be adjusted based on the invention method. The required field distribution within the metallic closed working area is made possible under pressure by inducing interference of the radiation from the two different radiation emission sources.

According to a particularly advantageous embodiment of the invention the objects are cooled, preferably substantially directly, after the heating by feeding in of a cooling medium with at least the pressure surrounding the object. Thus the objects can again rapidly be cooled to the temperature desired, which effects at the same time a reduction of the internal pressure.

The energy of an emitter can be subdivided into two directions and this can form two separate equivalent sources, which have the same or different polarizations. The two emitters can have approximately the same frequency and amplitude and they can operate in step in case of vertical relative polarizations.

At least two emitters of about the same frequency and amplitude and polarization can be employed in the low frequency alternating cycle and they can radiate into the work area at preferably opposite sides of a working area. In case of two or more emitters these can be operated successively with pulse control provisions. Preferably the high frequency radiation and the like are controlled via pressure and/or temperature measurements. The objects to be warmed can be passed intermittently by the microwave irradiation source and the pulse cycle is preferably controlled by the pressure and/or temperature within the working area.

Alternatively, the objects to be heated can be passed continuously by the microwave irradiation position and the irradiation can be turned off in each case in the transition region between neighboring objects. After the heating, the objects can be cooled substantially directly by feeding in of a cooling medium at at least the pressure surrounding the object.

There is also provided an apparatus for the heating of air-tight sealed objects with microwaves and preferably under the influence of external overpressure, where the provision comprises at least one microwave emitter, and in particular a magnetron, radiating into a metallic limited working area, which is in particular pressure tight, for the performance of the above method. The working area 6 is furnished with at least two radiation input openings 4 and 5, which are disposed such that the two high frequency fields overlap at least over a time average such in an object 7 under consideration of the absorption of the object that a presettable temperature distribution occurs.

As mentioned above, this construction results in advantages in particular in view of a desired field and/or temperature distribution inside of the object to be heated.

The working area can be dimensioned such that it is in longitudinal resonance and that the irradiating openings are disposed in the region of the longitudinal extension. The working area 6 can be provided with at least one input opening 33 and an output opening 34 for the cooling medium.

The working room 6 can be defined by a metallic floor plate 3 as well as by a dome cover like case part 8 from metal, which can be placed on the floor plate 3. The radiation input openings can be formed by radiation input windows 4, 5 in the floor plate, which are sealed against air by a radiation permeable covering 31 and the windows are disposed near the end regions of the longitudinal extension of the working area. Such a working area forms a pressure tight surrounding of the object to be heated, where the working area is about in longitudinal resonance because of disposition of the irradiation locations at about at the ends of its longitudinal extension of the working area.

At least one annual hollow waveguide with symmetrically disposed coupling in and coupling out locations can be provided and the pressure-tight working area can be formed by part of this hollow conductor at the coupling out location. This construction allows that an irradiation of an object to be heated can be furnished from two opposite sides with only one single microwave emitter. This thus represents a particularly simple embodiment.

The field direction can be parallel to the extension or respectively to a possibly provided transport direction of the object such that the magnetron or the like with its radiation emitters can be disposed in parallel to the longitudinal extension of the object and that the cross-section of the hollow waveguide is rectangular with sides longer in a radial direction.

The side input and output openings of the work area can be limited by metallic hollow cylinders of an under-critical diameter. The hollow waveguide can be provided by the difference space of two concentric balls with different radii and the coupling in and the coupling out positions can be placed at two oppositely disposed poles.

The hollow cylinder can have a square cross-section and advantageously at least two magnetrons can be employed with two polarization directions, which are independent from each other and disposed vertical to each other.

Several annular hollow waveguides can be disposed next to each other and in particular hollow conductors with magnetrons disposed at their side can be staggered in rotary direction in order to provide space for the coupled in emitters.

The about rectangular hollow conductor 20 can have a rectangular cross-section with sides which are shorter in radial direction and the magnetron or magnetrons can be disposed at the circumference of the hollow waveguide. Adjustable stubs can be coupled into the working area for influencing the field distribution in the working area.

The working area can be formed substantially by a metal tube with radiation permeable, but pressure-thight sealing window openings for the microwave radiation, and a plastic tube, preferably of polytetra fluoro ethylene (PTFE), can be provided contacting on the inside or on the outside of the metal tube. This embodiment is particularly adapted for a continuous operation, in particular for the heating of larger amounts of objects having a cylinder or bottle shape or the like, as are particularly known and used in the pharmaceutical industry.

A transport provision can be provided for transporting the objects through the working area. Pressure locks can be provided at the start and at the end of the working area and at least one cooling chamber can be provided ahead of or in the exit lock.

Flask-shaped containers can be employed for the receiving and for the transportation of objects through the tubular working area. If desired, the flask like containers can be coupled to each other and can be provided with guide rings and the oppositely disposed longitudinal sides of the container can be open for loading and unloading as well as for the irradiation with microwave energy from the two sides.

The containers 15 can be closed on their front side with metal walls 18 and can be provided with diametrically opposite disposed longitudinal webs 35, which connect the metal walls or the like. The guide rings at the ends of the containers 15 can simultaneously be formed as sealing rings resting against the inner wall of the guide tube.

The transport provision for the containers can continue outside of the working area and possibly behind a cooling provision for the loading and unloading. Preferably the transport provision is a closed circle running back to the start of the transport. In addition, parts of the guide tube located outside of the working area can have certain openings over certain regions for loading and unloading.

The containers can be joined to a chain or the like and can be connected to each other via flexible couplings. The transport provision can be preferably provided with symmetrically disposed toothed gears, which engage the outer jacket of the container while bridging the guide rings or the like.

The guide tube 19 can be provided with a slightly larger inside diameter D in the region of the working area as compared with the outer diameter of the container 15. Guide tube sections 37 can follow to this working area, where the guide tube sections have an inside diameter which is adapted to the container in the sense of forming a seal and which is smaller than the working area.

Referring now to FIG. 1 there is shown a device 100 for the heating and in particular sterilization of air-tight sealed packages 30 with objects 7. The device 100 is provided with a working area 6, which is delimited by a metallic floor plate 3 and by a dome like case part 8, which can be placed on the floor plate in an air-tight sealing way.

Radiation entrance openings formed as window 4 are disposed in the floor plate 3 and the entrance openings are disposed about the end region of the longitudinal extension of the working area. Preferably they are completely within a distance of less then one fifth of the total extension of the working are as measured from the end of the working area. The openings can be round or rectangular. Hollow waveguides 2 of two microwave emitters 1 are connected to these windows. One operates under external pressure within the working area 6 in order to prevent that the package of the air-tight sealed objects is destroyed during the heating by the increased internal pressure inside of the package. The pressure applied can be up to about ten atmospheres and where the requirements are less, a pressure of up to about one atmosphere can be sufficient. For this purpose initially sufficient water and/or humidity is placed into the working area 6. This allows to dispense with an external separate pressure generation. An exact compensation of the vapor pressure is not required, since the packaging of the object can pick-up a certain pressure difference. For sealing purposes of the working area 6 the windows are hermetically sealed by a radiation permeable covering 31. The covering can be provided by a polytetra fluoro ethylene (PTFE) plate, which exhibits a good pressure strength and gives a good seal and which provides a dielectric layer with negligible losses and with a small dielectric constant. The thickness of the polytetra fluoro ethylene covering can be from about 20 to 60 percent of the thickness of the floor plate. The permeable covering 31 can extend over the full floor area inside the working area and can be covering the contact area of the dome like cover 12. So-called high-frequency traps are designated as 9, which avoid a leakage of radiation of the high frequency energy in the sealing and separation region. The longitudinal resonance of the working area is employed with an appropriate reflection distance between the object and the walls for achieving homogeneous heating of the object, where the radiation entrance ports of the working area are in the end region of the longitudinal extension and where the working area is dimensioned to be not much larger than the object to be heated.

The case part 8 can be removed from the floor plate 3 in order to allow insertion of the object and to allow removal of the object 7 to be heated. A contact pressure generating device 14 is indicated in FIG. 2, which presses the case cover part 9 sealingly against the floor plate 3 with the intermediately disposed covering 31. The covering 31 is formed by a transporting belt 11. The working area 6 is hermetically sealed and closed after insertion of the object to be heated into the working area 6. As desired an about uniform energy density results over the extension of the object 7 in case two high frequency irradiation entrances are employed, as shown in the embodiment of FIG. 1 furnished with two microwave emitters 1 of about equal power and frequency. This results since the energy density decreases from an entrance window, for example the window 4, in the direction to the other window, for example 5, because of the absorption along the object, and the corresponding damping runs about like $\cos^2((\pi*1)/(4*1_0))$.

It can be recognized from this that the decrease of the energy density is approximately like a linear function. The two emitters together thus produce a nearly constant average value along the object 7. Local excess levels of the energy density can be prevented with specially formed diaphragms as is known in principle.

The two emitters are operated in an alternating cycle with a full power on the average in order that the adapted emitters 1 do not mutually interfere in case of a too dense coherency. This is achieved in a d.c. operation by alternating scanning and in case of an alternating current operation by a phase difference of 180 degrees at the transformer input port or the like.

Usually the packages 30 are welded hermetically already before the heating. If desired, the welding can occur in certain circumstances within the closed apparatus, for example if tension and contact pressure are fed in via flexible bellow tubes. It is necessary to provide sufficient humidity in the working area at the beginning of the treatment because of the required balancing of the vapor pressure.

It can be recognized from FIG. 1 that the dome like case part 8 comprises receiving openings 32 for the cooling agent. If desired, such openings can also be provided in the area of the base plate 3. The cooling of the object 7 is performed substantially after the heating to the desired temperature by direct injection of the cooling agent into the working area 6. A corresponding entrance opening 33 and an exit opening 34 are provided if desired with check and shut-off valves for feeding in and for removing the cooling agent. In addition, the receiver recess or recesses 32 of the case part 8 are provided with corresponding entrances and exits 33a, 34a. The cooling medium is pressed in under a pressure which corresponds at least to the pressure in the working area. It can be pressed in several batches or flow through continuously.

According to FIG. 1, the apparatus is provided as a batch type oven whereas FIG. 2 illustrates a continuous oven 12. The working area 6 or, respectively, the casing surrounding it is shown in FIG. 2 in a position rotated by 90 degrees as compared with FIG. 1. The apparatus according to FIG. 2 operates in cycles, which means that the dome like cap 8 is lifted after a treatment, which includes heating and cooling, such that the object 7 can be picked up. For this purpose, the transporting band 11 is moved on according to arrow Pfl by such a distance until the next object 7 is positioned in the region of the working area 6. Then the cap 8 is closed with the pressure contacting provision 14 and is pressed closely against the base plate 3, where the transporting band 11 provides a good seal and performs the same function as the covering 31 according to FIG. 1.

A preheating area is designated as 13, which allows to preheat the object in order to reduce the dwelling time in the oven 12.

As mentioned, radiation input port openings 4, 5 are disposed such according to the embodiments of FIGS. 1 and 2 that the two high frequency fields superpose at least on the average over time at the object 7 such that a predetermined temperature distribution is achieved in the object as desired.

A temperature sensor 10 (FIG. 1) can penetrate into the working area 6 for providing if desired an automatic control of the process operation. Also a pressure sensor or a manometer can be provided instead of or in addition to the temperature sensor if desired. The process operation can be controlled automatically based on a measurement of these parameters.

The above mentioned cooling of the object 7 with direct injection and/or flow through of the cooling agent through the working area 6 can be further improved by cooling agent disposed in or flowing through the input openings 32 of the case 8. A direct injection of cooling agent onto the object is possible because the object is located in general within a gas-tight and water-tight plastic shell. If desired, the cooling process can be repeated several times by using kind of a cycling process, where the heat capacity as well as the vaporizing and evaporation heat of the supplied cooling agent or of a suitable mixture becomes effective. The object is then disposed at least over a time average in a continuous cooling stream. The losses can be kept very low if conventional shielding and heat exchange are provided. This achieves that the cooling time and the warm-up time can be maintained completely comparable.

The object 7 is positioned at a maximum of the high frequency energy distribution of the superposed sum field. The sum field is a sequence of equal sized maxima at a distance of lambda of the cavity mode wave in case of equal frequency and phase of the radiation. This holds both in case a single emitter is employed, as is illustrated in FIGS. 3 and 4 as well as in case of several emitters, which are maintained by control operations at a fixed phase and equal frequency and preferably also equal amplitude. If the object 7 is positioned at the location of such a maximum then the following can be achieved by influencing the absorption of the object, that is based on the size of the object or, respectively, its electrical properties: In case of absorption the original amplitude of the field in the middle of the object is decreased and the neighboring minima show a correspondingly increased field amplitude. In case of a corresponding selection of the above mentioned properties of the object it can be achieved in this manner that the middle of the object experiences larger, smaller or also equal increases in temperature as compared with the surface region or the edge regions of the object. The object to be heated thus can extend also over more than a half wave beyond the neighboring original minima.

In case that several emitters are employed, which have about the same frequency and which advantageously have about the same amplitude, then the same process is repeated as set forth for the case of a single emitter, and the maxima add and fully or in part subtract depending on the phase relation in the high frequency field. This holds in case the polarizations of the two fields are in or have components in the same plane and a geometrical addition has to be performed. In case of vertical relative to each other disposed polarizations (compare FIG. 8) only the energies add over a time average. This results in the so-called scalar addition.

The embodiments described in FIGS. 3 to 5 show by way of example provisions in a multiple way, which comprise an annular hollow waveguide 20 with symmetrically disposed coupling in and coupling out locations. The pressure tight working area 6 is formed by a part of this hollow waveguide 20 at the coupling out location 22. The microwave emitter 1 is disposed at the coupling in location 21. Preferably, it comprises a magnetron, which engages with its dipole 23 on the side in axial direction into the annular hollow waveguide 20 at the coupling in location 21. Locations are designated as 24, where possibly elements can be provided for improving the matching and adapting properties. These serve for influencing the field distribution in the working area and form adjustable stubs coupled into the working area. The about annular hollow waveguide shows a rectangular cross-section with longer sides in radial direction as compared to the axial direction according to the embodiments of FIGS. 3 to 5. Thus the field direction is about parallel to the extension of the object or, respectively, to a possibly provided transporting direction of the object 7.

The embodiment of FIG. 3 is shown in cross-section in FIG. 4. It can also be recognized here that an object 7 to be warmed up is guided in a tube through the working area 6. The metallic hollow guide tubes adjoining on the side to the working area 6 have an undercritical diameter such that a side high frequency energy radiation is avoided. This is particular advantageous in case of the disposition of hollow wave guides as illustrated in FIGS. 5 and 6, since thus several of such hollow waveguides can be disposed at close distance from each other. The construction according to FIGS. 5 and 6 of several hollow waveguide assemblies as shown in FIGS. 3 and 4 is advantageous if larger object quantities are obtained. The working area then extends over the region of several of such hollow waveguides and it is surrounded by a tube 19. In order to be able to dispose the hollow waveguides closely spaced in axial direction despite the magnetrons 24 connected on the side, the individual hollow waveguides 20 operating with a working area are rotary staggered relative to each other, as is shown in the case of three hollow waveguides in FIG. 6. In case of larger objects the undercritical tubes are substituted by conventional annular shape high frequency traps.

It should be mentioned that according to the invention not only homogeneous heating of objects, but also directed heating at the middle position or at the side regions of the object for example are possible. For example, an inhomogeneous power distribution over the cross-section of the object is desired in the case of sterilization of milk, which passes into an insulating tube, where the parts streaming along the wall are slower as compared with the parts neighboring the wall because of the fluid friction at the wall. In case of a homogeneous field the part of the milk flowing along the tube walls would be heated too much as compared with the milk in the middle region. A uniform heating over the cross-section can be achieved by a directed field distribution despite these differences in the speed of flow. Another example are food stuffs such as for example rolls with inserted parts of a high water content such as for example meat or the like, which are contained in a package.

Figure 7:
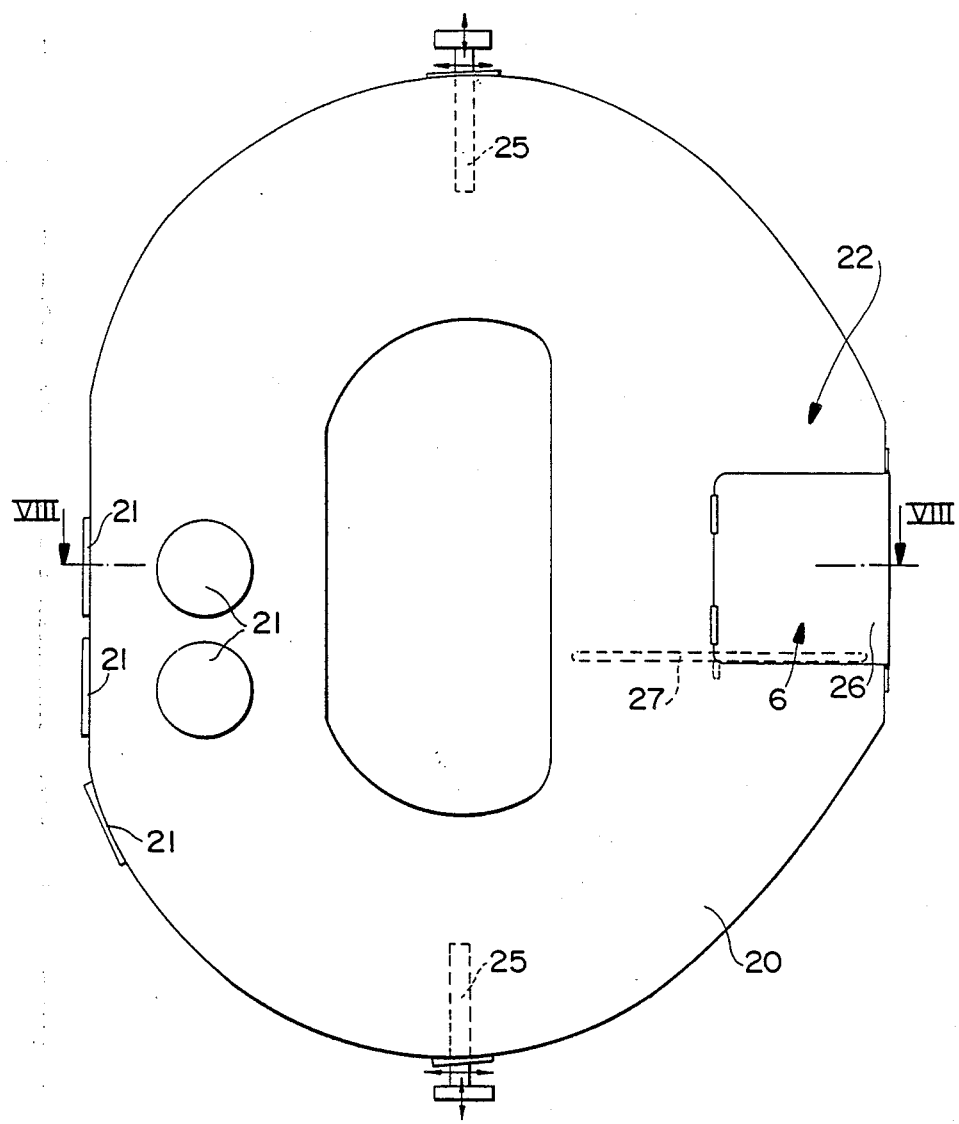
FIG. 7 is a side view of an annular hollow waveguide with several coupling positions for microwave emitters.

A hollow waveguide construction is shown in FIG. 7, where the hollow waveguide 20 exhibits a square cross-section as can be seen in FIG. 8. This provides the possibility to couple in simultaneously several polarizations without mutual interference. In principle, also a round cross-section could, be employed. Several coupling-in locations 21 can be recognized at this hollow wave guide, where microwave emitters, in particular magnetrons, can be mounted. The coupling locations of object or, respectively, working area are displaced by an even multiple of one half of lambda where several emitters are employed. Emitters of the same polarization direction are here operated at different times. According to this construction several emitters can be employed where the radiation energy is additive.

The resonance area is toroidal according to the embodiment of FIGS. 7 and 8 and two wave trains can run in opposite directions in the torus. The working area 6 is cylindrical or square delimited in the direction of its main extension, such that it can electromagnetically vibrate in several polarization directions. If no special effects are desired, then its diameter and the length of its edges are dimensioned such that no nodal points can occur in the cross-sectional plane, that is the diameter is of the same magnitude as a wavelength. The separation of the polarization and of the coupling-in is rendered easier by a square cross-section. The main profile of the hollow waveguide is a circular polygon or a polygon with adapted corner bends. The coupling-in locations 21 in each case are shifted by a quarter wavelength either on the circumferential side or at a right angle to that on the side surface.

The coupling-in locations 21 are decoupled already completely as far as polarization is concerned and the capacitance coupling does not play a noticeable part. They are in part decoupled, since in view of the large interior extensions of the hollow space the field only slowly expands over the full cross-section and in fact symmetrically only from locations which are disposed symmetrically in circumferential direction and swinging from the asymmetrical locations at the inside to the outside and back. This effect is also employed to increase homogenization. It holds for all coupling-in points that the hollow waveguide closed in itself represents a resonance space, where two wave trains can run in opposite direction from the coupling-in locations 21 and can superpose to resonance forming fields. The coupling-in point is in each case a symmetry point. The level of resonance and the phase relative to the phase of the emitting dipole can be adjusted by the electrical length of the hollow conductor. For this purpose adjustment elements can be provided, which can be stubs and which can be adjusted according to the double arrows shown in FIG. 7.

An important effect at the object location results by the lambda/4 displacement of two coupling-in points of the same polarization and two planes in each case with maximum field amplitude follow sequentially to each other. Since the emitters do not oscillate coherently, only the average amplitude square of the field operates in the object space. The amplitude square of cosine is nearly exactly linear from 0 to 1 and the sum is nearly exactly 1 when time averaged. Thus the two fields generate a homogeneous heating at the location of the object despite total resonance independent of the two-sided polarization. The emitters are operated in a counter cycle or in an alternating cycle in order to avoid interferences in case of several emitters with the same polarization and coherency. In case of more than two emitters also a pulse control can be provided for a successive operation of the emitters.

The working area 6 can be closed by an about semicircular door 26 as shown in FIG. 7. A turntable is shown with dashed lines at 27 and the object to be heated can be placed onto the turntable. A homogenization in the plane can correspondingly be achieved with this turntable. It can be recognized from FIG. 8 that the emitter dipoles 23 of usual power magnetrons 24 in case of a rectangular cross-section of the hollow waveguide 20 are disposed at a right angle relative to each other.

The above described steps individually or in particular in combination allow to add over a small space large energy powers without mutual interference. This allows to meet for example the precondition for a modern automatic food processing technique, where food or meal portions can be delivered from a deep frozen reservoir based on pressing of a knob within a time of for example two to three seconds.

Hollow waveguide constructions are shown in FIGS. 15 and 16 where the about annular hollow waveguide 20 has a rectangular cross-section with shorter sides in radial direction as compared to axial direction. The magnetrons 24 are disposed in this case at the outer circumference of the hollow conductor 20 in the coupling in region 21. The coupling out location is usually disposed on the opposite side, however, it can also be provided at a location of about 90 degrees relative to the coupling in location.

A provision is shown in FIGS. 9 and 10, where the working area 6 is formed substantially by a metal tube 28 with radiation permeable, however air-tight sealed window openings 29 for the microwave radiation. A plastic tube preferably of polytetra fluoro ethylene (PTFE, Teflon) adjoining the metal tube 29 on the inside according to FIG. 10 and on the outside according to FIG. 11 can be provided for sealing of the window opening 29 for the microwave radiation input. The object 7 in their original package or in support containers 15 are loosely transported through the tube. A pressure lock 16 is provided at the beginning and at the end of the tube in each case. The coupling out points 22 of the hollow waveguide 20 are located at the window openings 29. At least one cooling chamber not illustrated here is placed ahead of or within the exit lock.

An embodiment is shown in FIG. 10, where a piston like container 15 is provided for the receiving and for the transportation of objects through the tubular working area 6. If desired, these can be coupled mechanically to each other. They are provided with guide rings 17, which at the same time form sealing rings contacting the inner wall of the tube.

The containers 15 are closed at their front side with metal walls 18 (compare FIG. 13). A preferred embodiment of a receiver container 15 is shown in FIGS. 12 and 13. It can be recognized here that the containers starting at their front side metal walls 18 are provided with diametrically opposed longitudinal webs 35. The tension forces occurring at the pressures generated can be easily picked up by the longitudinal webs, which can be formed comparatively narrow. The operating pressure can be for example from about 2 to 3 bar. The receiver containers 15 are well adapted for the supporting of objects 7 in particular in view of these longitudinal webs, which can be constructed of comparatively narrow size. The objects are prevented from falling out inside of the tube by the tube itself.

The guide tube is provided with corresponding openings on the top and/or bottom side for the loading or unloading of the containers 15 ahead and behind of the pressure locks. The pressure locks 16 are furnished in particular with rotary slides. It should be mentioned that immediately behind the input lock gate a direct pressure loading from the outside occurs upon entering of the object 7. However, this does not damage the packaged objects. In contrast, after the heating and before the passage of the output lock one has to take care of that the overpressure prevailing inside of the package is decreased by cooling, as mentioned above.

A variation of the embodiment of FIG. 10 is shown in FIG. 14. It is provided here that the guide tube 28 or 36 exhibits a slightly larger diameter inside diameter D in the area of the working room 6 as compared to the outer diameter of the container 15 or the like. Guide tube sections 37 with a smaller inside diameter versus the working area and coordinated to the container in the sense of a sealing follow on the two sides to this working area. This results in the advantage that in each case only the passage friction in the sealing zone during the passage of the container 15 with the contained objects 7 has to be overcome.

Overall there results even in the case of a plurality of successive following containers a substantially smaller passage resistance. The internal pressure is equal inside of the region with a somewhat increased diameter such that the containers located within this region are pressed with an increased pressure.

It is further shown in FIG. 11 that advantageously the metal tube 28 can be disposed on the inside for the guiding of the receiver containers 15 or the like and the plastic tube is contacting the metal tube 28 on the outside for a pressure-tight sealing of the window openings 29. This results in a frictional pairing between the sealing rings 17 of the support containers 15 and the metal tube 28, based on which a substantially lower friction is present. In addition, the transportation resistance can be decreased thereby.

It should be mentioned in view of the containers according to FIGS. 12 and 13 that these support containers are preferably made of metal. This results in a good high frequency shielding based on the metal front walls 18, which prevents a radiation leakage to the outside. If necessary, sheet metal lamellae 38 forming a spring collar could be provided at the ends of the containers, which further improve a shielding to the outside.

Instead of individual containers 15 for the support of the objects 7 to be heated it is also possible to employ a bendable corrugated tube of metal or plastic, which tube is furnished with openings at certain distances for the irradiation and for the placing and removal of the objects 7. It would then be necessary that at certain distances the tube is provided with seals. This embodiment would possibly result in a simpler production process as compared with a plurality of individual containers.

The containers are joined to a chain according to the embodiments of FIGS. 9, 10, and 14 and the containers are coupled to each other via flexible couplings. Advantageously, a transporting mechanism not shown here with preferably symmetrically disposed toothed gears is employed for the transporting of this chain of containers, which toothed gears can engage the outer jacket of the containers by bridging of the guide rings or the like. The complete transporting provision with the guide tube for the containers can continue outside of the working area and also behind a possibly provided cooling provision for loading and unloading and it can then be fed back to the start of the run in a continuous cycle.

It is noted regarding the embodiments of FIGS. 15 and 16 that it is advantageous in the context of these embodiments with magnetrons 24 at the periphery of the hollow wave guide 20 that a more favorable space situation is present as was illustrated in the context of FIG. 5. The hollow wave guides can possibly be brought closer together with such a disposition. This is advantageous for objects which require for heating a somewhat longer horizontal field. It is further indicated in FIG. 16 with dashed lines that, in addition to the working area 6 disposed opposite to the coupling-in location 21 with axial run through direction, also corresponding working area openings in the intermediate region can be provided for a radial running through possibly on opposite sides of the hollow waveguide.

According to an embodiment not illustrated in the Figs. the hollow waveguide can also be formed by the difference space of two concentric balls with differing radii, where the coupling-in and the coupling-out points are disposed at two opposite poles. This would result in a particularly advantageous concentration of energy.

It is further mentioned that in the case of hollow waveguides with magnetrons disposed like neighbors there exists in fact a certain spacial coupling in the cold state, which already would result in a noticeable loss dissipation energy absorption. This coupling is reduced to a negligible value, since the corresponding cathode is heated even in case the cathode voltage is shut off, and where the electron emission occuring under the circumstances damps the magnetron resonance circuit sufficiently.

Overall the invention system provides for the heating of objects in a microwave field to in particular higher temperatures of for example 130 degrees centigrade, where several bars of overpressure can be generated because of the water contents of the respective object.

The objects can be pharmaceutical preparations or food stuffs to be sterilized and they are sealed into a vacuum tight package, which allows microwave radiation to permeate, but which is in general incapable of withstanding the increased internal pressure. The required outside counter pressure is provided in the instant case in general by evaporating humidity and/or water.

The pressure-sealing, substantially metallic closed working areas represent special tasks for the radiation input constructions for the high frequency radiation because of their mechanically necessarily small dimensions in order to achieve for example a homogeneous heating even in case of larger objects. This can be achieved by having two radiation fields interfere, where the highest concentration in general is achieved at the center of the object and which allows the achievement of the desired temperature distribution on the way to the center of the object. The necessary final temperature and the dwelling time can be reduced to a large extent with a high gradient, since the sterilization success does not only depend on the temperature reached and on the dwelling time of that temperature, but depends also to a large extent on the speed of the temperature increase and decrease, that is on the temperature gradient versus the time. This provides a considerable advantage of the present invention in view of conventional systems. Therefore, the present system is concerned with focussing several emitters onto a single object and separating the fields by orthogonal polarization and by differing time regions for emitted high frequency energy pulses. Production furnaces with an emitter aggregate up to continuous furnaces with as many aggregates as desired and corresponding rapid chilling have been specified as embodiments.

It will be understood that each of the elements described above, or two or more together, may also find a useful application in other types of heating system configurations and food processing procedures differing from the types described above.

While the invention has been illustrated and described as embodied in the context of a system for heating objects with microwaves, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An apparatus for heating an object with microwaves, comprising:
   (a) an annular hollow toroidally shaped waveguide forming an open space in the middle thereof, said waveguide being continuous in shape such that a signal emitted at any origin point in said waveguide returns to said point of origin after travelling 360 degrees around said waveguide;
   (b) a first microwave emitter positioned proximate the outer circumference of said continuously formed waveguide so that a signal emitted from said first microwave emitter at a first point travels around said toroidal waveguide and returns to said first point;
   (c) a second microwave emitter positioned proximate the outer circumference of said continuously formed waveguide so that a signal emitted from said second microwave emitter at a second point travels around said toroidal waveguide and returns to said second point, wherein said first and second emitters are positioned on a first side of said open space formed by said waveguide; and
   (d) a working area positioned on a second side of said open space formed by said waveguide, opposite from said first side on which said emitters are positioned, wherein said working area is adapted to receive said object to be heated.

2. The apparatus defined by claim 1, further comprising:
   a turntable in said working area that is adapted to support and rotate said object; and
   reciprocating adjustment stubs positioned on opposite portions of said waveguide for adjusting the relative phase of said microwaves from said first and second emitters.

3. The apparatus defined by claim 1, wherein said waveguide has a substantially square cross-sectional configuration, said waveguide having a bottom wall and a side wall that is perpendicular to said bottom wall, said first microwave emitter being positioned on said bottom wall such that it extends substantially vertically upward, said second microwave emitter being positioned on said side wall such that it extends substantially horizontally.

4. An apparatus for heating an object with microwaves, comprising:
   (a) a plurality of annular hollow toroidally shaped waveguides, each waveguide having a working area that is adapted to receive said object to be heated, said waveguides being positioned such that said working areas of each waveguide are aligned with each other in a substantially straight line;
   (b) means for producing microwaves signals in said waveguides, said microwave signal producing means being positioned proximate the outer circumference of said continuously formed waveguide so that a signal emitted from said microwave emitter travels around said toroidal waveguide and returns to its point of origin; and
   (c) a tube that extends through each of said working areas of said plurality of waveguides for receiving said object to be heated.

5. The apparatus defined by claim 4, wherein said tube has a plurality of air-tight windows that are permeable to microwave radiation, each window being positioned in one of said working areas.

6. The apparatus defined by claim 5, further comprising a plastic tube that is positioned outside said tube for forming an air-tight seal for said windows.

7. The apparatus defined by claim 5, further comprising a plastic tube that is positioned inside said tube for forming an air-tight seal for said windows.

8. The apparatus defined by claim 5, further comprising:
   at least one container for transporting said object to be heated inside said tube;
   at least one guide and sealing ring that is positioned at one end of said container for guiding and sealing said container in said tube; and
   a pressure lock positioned at each end of said tube.

9. The apparatus defined by claim 8, wherein said container has two longitudinal webs that are positioned opposite one another in said container.

10. The apparatus defined by claim 8, wherein the diameter of said tube is greater than the diameter of said container in said working area, the diameter of said tube outside of said working area being such that top and bottom portions of said container contact top and bottom portions of said tube.

* * * * *